Figure 1:
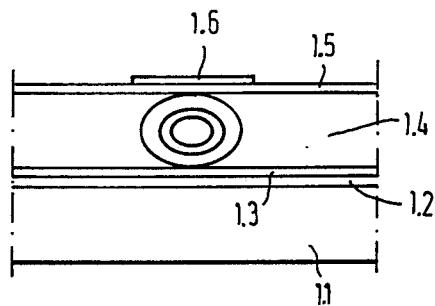

United States Patent [19]

Baken

[11] Patent Number: 4,867,516
[45] Date of Patent: Sep. 19, 1989

[54] ELECTRO-OPTICALLY INDUCED OPTICAL WAVEGUIDE, AND ACTIVE DEVICES COMPRISING SUCH A WAVEGUIDE

[75] Inventor: Nicolaius H. G. Baken, Voorburg, Netherlands

[73] Assignee: Staat der Nederlanden, The Hague, Netherlands

[21] Appl. No.: 246,886

[22] Filed: Sep. 15, 1988

Related U.S. Application Data

[63] Continuation-in-part of Ser. No. 198,619, May 20, 1988, abandoned, which is a continuation-in-part of Ser. No. 30,037, Mar. 24, 1987, abandoned.

[30] Foreign Application Priority Data

Mar. 26, 1986 [NL] Netherlands ........................ 8600782

[51] Int. Cl.$^4$ ................................................ G02B 6/10
[52] U.S. Cl. .............................. 350/96.14; 350/96.12; 350/96.34
[58] Field of Search ............... 350/96.11, 96.12, 96.13, 350/96.14, 96.15, 96.29, 96.30, 96.34

[56] References Cited

U.S. PATENT DOCUMENTS 3,695,745 10/1972 Furukawa ........................ 350/96.14
4,077,700 3/1978 Camphausen .................... 350/96.13
4,094,606 6/1978 Camphausen ................. 350/96.14 X

FOREIGN PATENT DOCUMENTS 0025386 3/1981 European Pat. Off. .
0081477 6/1983 European Pat. Off. .
0149678 7/1985 European Pat. Off. .
0218938 4/1987 European Pat. Off. .
2533714 3/1984 France .

OTHER PUBLICATIONS

IEEE Journal of Quantum Electronics, vol. QE-12, No. 5, May 1976 (New York, U.S.) J. A. McMurray et al. "Electrooptic phase . . . ".
IEEE Journal of Quantum Electronics, vol. QE-8, No. 6, Jun. 1972 (New York U.S.) W. S. C. Chang et al.; Theoretical design . . .
Applied Optics, vol. 13, No. 11, Nov. 1974 (New York, U.S.) J. F. Lotspeich–"Single-crystal Electrooptic Thin-film Waveguide Modulators". . .
Patents Abstracts of Japan, vol. 8, No. 10 (P-248)(1447), Jan. 18, 1984, zie figuren & JP. A. 57172619 (Matsushita Denki Sangyo K. K.) 10/11/83.
SPIE vol. 578 Integrated Optical Circuit Engineering II (1985) "Organic Nonlinear Optical Materials". pp. 130–136.
SPIE vol. 704 Integrated Optical Circuit Engineering IV (1986) "Electro–optic Polymer Glasses". pp. 240–246.
Applied Optics/vol. 13, No. 6/Jun. 1974–"Distribution Networks and Electrically Controllable Couplers for Integrated Optics", pp. 1372–1375.

Primary Examiner—John D. Lee
Attorney, Agent, or Firm—Frishauf, Holtz, Goodman & Woodward

[57] ABSTRACT

A light waveguide device including a thin film of a polymer material capable of exhibiting the electro-optic effect. The composite structure of first electrode, buffer layer, thin film layer, second buffer layer and second electrode covering substantially the entire area of the adjacent major surface of the thin film layer, is disposed on a substrate which underlies the second electrode. In an alternative embodiment the first buffer layer is a strip-shaped ridge on those thin film regions only which are in registration with the first electrode. Various types of integrated optical components can be readily implemented. Embodiments of a phase modulator, directional coupler, switch and bending section are described.

23 Claims, 2 Drawing Sheets

ELECTRO-OPTICALLY INDUCED OPTICAL WAVEGUIDE, AND ACTIVE DEVICES COMPRISING SUCH A WAVEGUIDE

This application is a continuation-in-part of application Ser. No. 07/198,619, filed May 20, 1988, which is a Continuation-In-Part of application Ser. No. 07/030,037, filed Mar. 24, 1987 both of which are now abandoned.

A. BACKGROUND OF THE INVENTION

1. Field of the Invention

The invention relates to an optical waveguide induced by electro-optic working, and to devices comprising such a waveguide. Interaction between light and an applied electric field causes in a medium, at least if an electro-optic coefficient of it has a certain magnitude, such a refraction index distribution that a light wave guiding path in this medium is defined.

2. State of the Art

An optical waveguide of the type described above is known from for example the reference (1) mentioned under D. According to this known technique a single-crystal substrate of $KNbO_3$ in the form of a plate cut perpendicular to the b-axis, is used. The upper surface of this plate is provided with two parallel strip-shaped electrodes disposed adjacent to each other. An electrostatic field, the principal direction of which coincides with that of the c-axis, can be effected by means of these electrodes. Interaction between this field and light causes an electro-optic effect in the substrate. More in particular a TE-mode light wave guiding path is induced in this substrate, at least in so far as the field vector, the optical axis of the material of the substrate and the electric vector of the light mainly follow one and the same direction.

Such a known structure has the following drawbacks: small degree of freedom with respect to the possibility of using and the way of application;

the density of the electro-static field and consequently the light-field interaction is relatively strongly dependent on a certain position;

one light wave guiding path requires two parallel electrodes disposed adjacent to each other in one and the same plane;

a combination crystal plate-electrodes is a "bulk"-structure which lends itself less favourably to be used in the field of integrated optics.

The reference (2) mentioned under D discloses several sorts of integrated optical devices, such as a modulator and a switch, the working of which is also based on the electro-optic effect. The basic structure proposed in the scope of this known technique is in essence in conformity with what is disclosed in the above-mentioned reference D (1). Reference D (2) adds to this an embodiment of an electro-optic switch with three parallel strip electrodes disposed in one and the same plane. Such an embodiment has in principle the same drawbacks as those mentioned in connection with reference D (1). Moreover, it is required that the central electrode has a very small width compared with the side electrodes, which is a drawback from a manufacture-technical point of view.

The reference (3) mentioned under D discloses electro-optically induced strip waveguides, use being made of a planar $LiNbO_3$ substrate containing a diffused thin Ti-film. In this connection the relations between the division of the optical field and possible propagating modes are considered in this reference. Attention is called to the possibility to utilize the effect, that there can be various pq-modes due to an external electric field, for modulating the intensity of an optical signal. This known technique too has the same drawbacks as those mentioned in connection with reference D(1).

The reference numbered (6) under D describes a light waveguide device comprising:

a substantially flat portion of electro-optic material;

a first electrode formed in a preselected pattern on one major surface of said portion;

a second electrode formed on an opposing surface of said portion;

a buffer layer interposed between said first electrode and said portion of electro-optic material; and means for causing a voltage to occur across said portion of electro-optic material through said first and second electrodes.

These prior art devices in general comprise a transparent body of electro-optic material, more in particular a crystal plate of sizable thickness. Such a body or plate of electro-optic material by itself provides a substrate of an optical integrated circuit to be provided. Therefore the composite device including such body or plate and first and second electrodes arranged on opposing major surfaces of such a body or plate, actually is a "bulk"-structure. Such bulk-structures inherently fail to meet requirements of modern technologies in the field of manufacturing integrated optical circuits. Moreover due to the sizable thickness of a crystal plate capable of exhibiting the electro-optic effect the density of the electrostatic field induced by an electric voltage applied across such crystal plate, to a certain extent is non-uniform. Further the overall voltage required to induce a light wave guiding path therein is relatively high, which for many applications is highly adverse. In addition this prior art is typically intended for multimode light. In view of these facts the crystal body portion lying beneath the electrode pattern does not form a sharply and well defined light transmission path therein. Therefore the degree of freedom to use and apply the above prior art is detrimentally restricted.

SUMMARY OF THE INVENTION

It is a general object of the present invention to provide a novel structure of a light waveguide device. It is a more specific object of the present invention to provide an improved light waveguide device as compared to the prior art devices as discussed hereinbefore under A2.

A light waveguide device comprising a substantially flat portion of electro-optic material, a first electrode formed in a preselected pattern on one major surface of said portion, a second electrode formed on an opposing surface of said portion, a buffer layer interposed between said first electrode and said portion of electro-optic material and means for causing a voltage to occur across said portion of electro-optic material through said first and second electrodes, is according to the present invention characterized in that said portion of electro-optic material is a thin film of a polymer of a kind described below obtainable by evaporation of the solvent from a solution of the polymer application thereof in already polymerized form on said second electrode or on a second buffer layer superposed on said second electrode, for volatile solvent; said polymer having a $\Delta n > 0.005$ at 1 V/$\mu$m, with $\Delta n$ representing a change of refractive index n of said electro-optic material caused by said voltage; said polymer being, generally, a polymer providing a high density of hyperpolarizable groups by reason of which an increased electro-optical effect may be obtained; the composite structure including in the following order said first electrode, said buffer layer, said thin film, and said second electrode, is supported by and attached to a substrate; said second electrode covers substantially the entire area of that major surface of said thin film turned towards said substrate.

The electro-optic coefficient of the thin film material employed in the device of this invention is high in relation to that of prior art electro-optic materials. Illustratively the $r_{33}$-factor of the thin film polymer material is about 30–100 times higher than that of $LiNbO_3$.

The electro-optic polymer as employed in a light waveguide of the present invention conveniently is applied in the form of a very thin film of uniform thickness on a substrate, such as thin film having an optical axis substantially perpendicular to the major surfaces thereof.

Present-day technology allows the implementation of a structure wherein an applied voltage of about 5 V across the aforesaid thin film through the first and second electrodes, induces a well defined light waveguide path therein with an outstanding confinement for monomode such as $EM_{oo}$, light.

With monomode TM-light, the interacting components, i.e. electric field, optical axis of electro-optic thin film and light vector (the electric vector of the guided TM-polarized light) are all substantially perpendicular to the major surfaces of the thin film and substrate. This means an extensive degree of freedom to select a pattern of the first electrode, while irrespective of the selected electrode pattern, a substantially uniform electro-optic effect is ensured.

A light waveguide device of the present invention is further improved by locally disposing said buffer layer to form a ridge of predetermined height, on those thin film portions only, which are in registration with said first electrode formed in a predetermined pattern on said thin film. Due to such a strip-shaped buffer layer the refractive index of the electro-optic thin film in the region underneath said strip-shaped buffer, is increased. For a given wavelength $\lambda_o$ (in vacuum) the fundamental $EM_{oo}$-mode of light is allowed to propagate through the above structure, provided the strip-shaped buffer layer is of sufficient height (thickness). There is a critical value $h_{cut\ off}(\lambda_o)$ for which the $EM_{oo}$ mode considered is just cut off. For $h_{cut\ off}(\lambda_o)$ there is achieved a so-called "waveguide subthreshold". In other words such a strip-shaped buffer layer functions to locally increase the effective refractive index of the electro-optic thin film in a region beneath the first ("pattern") electrode thereby providing a certain bias in the complex of conditions required for inducing a light wave guiding path into said thin film. Thereby only a relatively small variation of the voltage applied through the first and second electrodes is needed to selectively switch the structure into a state wherein a light wave guiding path is provided or not. Further the above strip-shaped buffer layer effectively improves the lateral (i.e. transverse relative to the height or thickness dimension of the overall structure) confinement of the electric field caused by the application of voltage across the thin film layer. Thereby the lateral confinement of the optical effect is improved.

An alternative embodiment of a light waveguide device of the present invention is further characterized in that said thin film of electro-optic material is locally poled in those regions only where said first and second electrodes are aligned in registration. Thereby those regions of the thin film of electro-optic material not covered by the pattern of the first electrode are neutral. This is an option which cannot be implemented with a structure wherein the electro-optic material is a crystal plate of for example $LiTaO_3$ or $Ba_2NaNb_5O_{15}$.

The present invention is advantageous for the implementation of active integrated electro-optic components.

When the first electrode is a single strip, a light waveguide device of the present invention can be readily employed as an integrated optic phase modulator. The d.c. voltage necessary for inducing a light wave guiding path into the thin film region beneath the single strip electrode, then is combined with an alternating (modulating) voltage. Thereby the propagating light is phase modulated. The feature of a modulator of the above structure, whereby the phase modulated light is propagating along a well confined and small apertured transmission path, makes it feasible to directly couple the modulation output to a monomode glass fiber, without introducing intolerable losses.

A light waveguide device of a type as described in the reference numbered (6) under D, and wherein said first electrode is arranged on said one major surface in a pattern of a plurality of parallel strips, is according to a further aspect of the present invention characterized thereby that said pattern includes three pairs of parallel strips, said pairs extending co-linearly while being disposed adjacent to each other; each one of said strips having its individual connecting means for receiving an electric voltage. Thus structured a light waveguide device of the present invention is designed to function as an integrated optic directional coupler.

By applying an electric voltage across the thin film polymer through selected ones of the strips of the first electrode pattern, and the common second electrode, a light wave is readily caused to propagate following a selected transmission path configuration.

Optionally a light waveguide device of a type in the reference numbered (6) under D, and wherein said first electrode is arranged on said one major surface in a pattern of a plurality of parallel strips, is according to the present invention characterized thereby that said pattern includes a third strip partially extending in between said parallel strips and in parallel thereto; each one of the strips included in said pattern having its individual connecting means for receiving an electric voltage. Thus structured a light waveguide device of the present invention, by applying an electric voltage across the thin film polymer through selected strips of the first electrode pattern and the common second electrode, is selectively caused to function either as a switch of the communicative type or as a switch of the distributive type.

An alternative embodiment thereof is according to the invention characterized by a further strip section interposed between said pair of parallel strips; said fourth and third strips extending co-linearly, while being disposed adjacent to each other; each one of the strips included the composite pattern having its individual connecting means for receiving an electric voltage.

An integrated optical bending section having a small radius of curvature, and wherein said first electrode includes a bent strip portion is according to the invention characterized thereby that said thin film or its major surface facing said buffer layer, has a ridge of electro-optic material integrally formed therewith; said ridge substantially conforming in size and shape to said bent strip portion; said bent strip portion is disposed in partially overlapping relation to said ridge.

The present invention yields the following advantages:

parasitic coupling between light wave guiding paths is eliminated;

the attenuation introduced during light wave transmission is relatively low;

simplified manufacturing process;

increased number of separate light wave transmission paths per unit of surface area is readily implemented; and feasibility to induce light wave guiding paths having substantially equivalent transmission characteristics.

C. SHORT DESCRIPTION OF THE DRAWING

Figure 5:
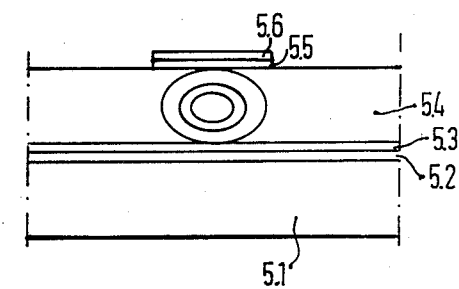
Figure 4:
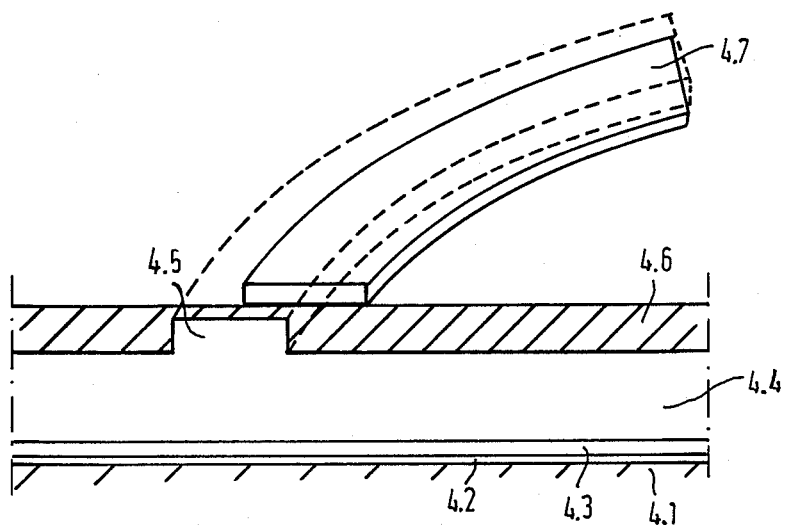
Figures 2, 3:
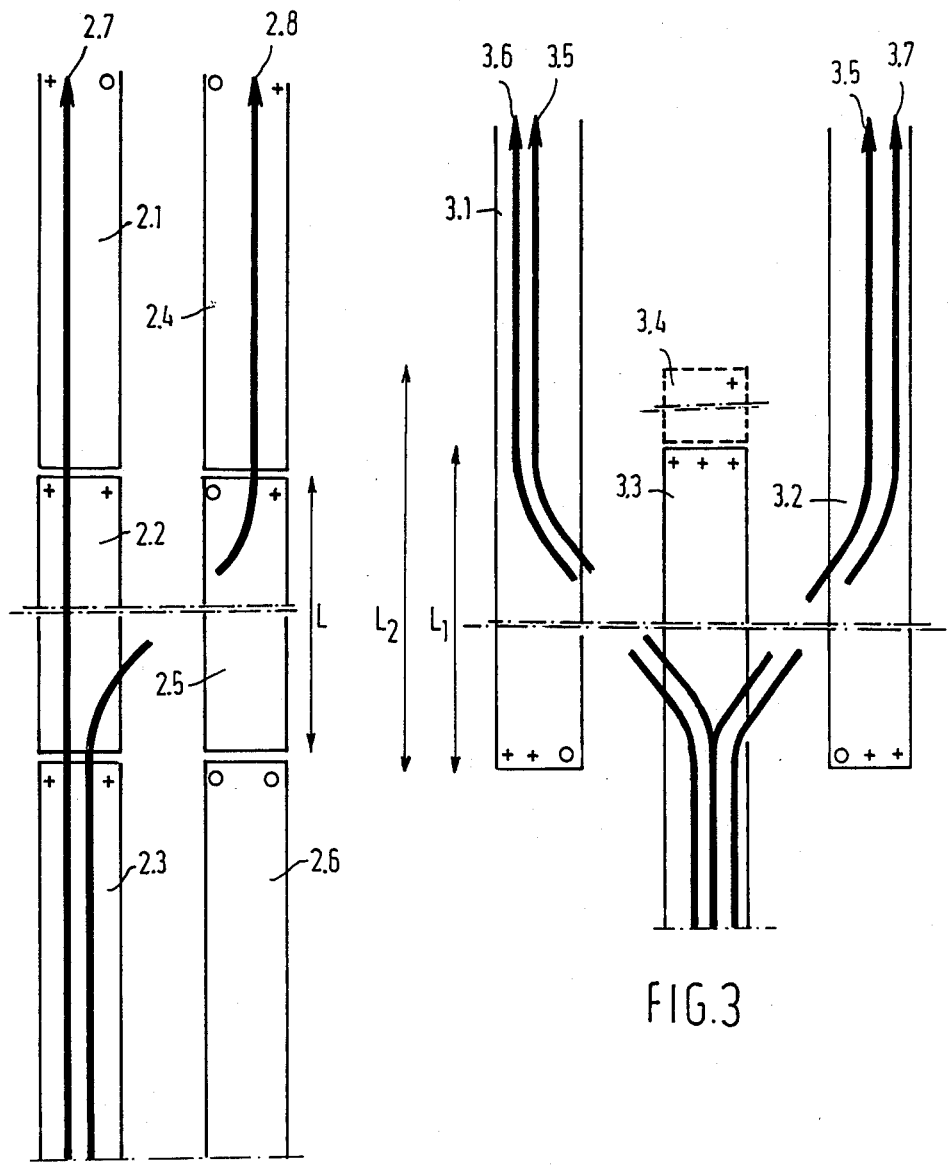

The invention will be further elucidated hereinafter with reference to the drawing, in which FIG. 1 schematically shows an embodiment of an electro-optically inducible light waveguide according to the invention;

FIG. 2 schematically shows an embodiment of an integrated optical directional coupling according to the invention;

FIG. 3 schematically shows an embodiment of an integrated optical switch according to the invention;

FIG. 4 schematically shows an integrated optical bend according to the invention; and FIG. 5 schematically shows an alternative embodiment of a light waveguide device wherein a light transmission path is electro-optically induced.

D. REFERENCES (1) Article by J. C. Baumert et al. entitled "KNbO3 electro-optic induced optical waveguide cut-off modulator", published in "Appl. Phys. Lett." 46(11) June 1985;

(2) Article by P. Vandenbulcke et al. entitled "Static field analysis of thin film electro-optic light modulators and switches" in "Wave Electronics" (1974, 76) pp. 295-308;

(3) Article by L. Savatinova et al. entitled "Electrically induced Ti:LiNbO3 strip-waveguides: Effect of electro-optic modulation" published in "Journal of Optical Communications" 1984, pp. 10–15;

(4) French patent application 022297(06.09.79) concerning: Integrated electro-optical switch for telecommunications;

(5) DNL-monograph 8502 entitled "Integrated Optica", author N. H. G. Baken (publication Netherlands Postal and Telecommunications Services Dr. Neher Laboratory, Leidschendam, NL); and (6) U.S. Patent Specification 3,695,745.

E. DESCRIPTION

The scheme represented in FIG. 1 is illustrative of an embodiment of an electro-optically inducible optical waveguiding structure. This structure comprises a substrate 1.1; an electrically conductive film 1.2 formed on it and serving as an electrode; a light insulating (first) buffer layer 1.3 formed on the film; a film 1.4 of electro-optic material formed on the buffer layer; a light insulating (second) buffer layer 1.5 formed on the latter film; and an electrode 1.6 supported by that buffer layer.

The mode of such an optical waveguiding structure is generally adapted to that of a monomode optical fiber with a core diameter of 5–10 μm and a numerical aperture of c. 0.10–0.15 which are characteristic of such a fiber. The substrate can consist of an Si-wafer with an SiO2 upper layer, of a small glass plate, or of a suited dielectric substrate. The first buffer layer 1.3 and the second buffer layer 1.5 consist of for example a layer of SiO2 or polystyrene. Such a layer can be applied by means of the usual technique. A characterizing thickness is for example 100–300 nm. As an alternative polyimide film layers in an acetone solvent can be applied by means of the spinning method. The electrodes 1.2; 1.6 can be made of aluminium or of gold. Alternatives are thick-film transparent electrodes or thin-film transparent electrodes. The electro-optic film 1.4 can be deposited from a solution of an electro-optical polymer dissolvable in a volatile solvent for example Chloroform, Dichloromethane and so forth. The initially preferred electro-optic polymers for the film 1.4, which have been found to have unexpectedly high electro-optic effect in thin film structures and devices according to the invention, are linear addition (i.e. long chain) polymers having hyperpolarizable side groups in which recurring units of the polymer correspond to the formula

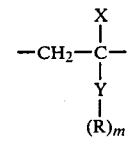

wherein X represents a hydrogen atom or a lower alkyl group wherein m=1 or 0, and where, in case m=1: Y represents a

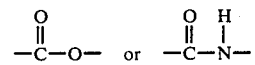

group and R represents:

(a) a hyperpolarizable group having a hyperpolarizability B of at least $10^{-38}$ m$^4$/V, whether or not including a spacer and whether or not along with (b) a mesogenic group whether or not including a spacer, and/or (c) a hydrogen atom or a substituted or unsubstituted organic group having not more than 30 carbon atoms, and whereas, when m=0, Y represents —CN, a substituted or unsubstituted phenyl group or a group of the formula —OR$_1$ or —CH$_2$OR$_1$ wherein R$_1$ represents a hydrogen atom or a substituted or unsubstituted aliphatic group having not more than 20 carbon atoms, provided that:

at least 10% of the recurring units in the polymer contain a hyperpolarizable group having a molecular hyperpolarizability of at least $10^{-38}$ m$^4$/V, at the most 40% of the recurring units in the polymer contain a mesogenic group, and the quotient of the degree of substitution of the recurring units with a group having a molecular polarizability B of at least $10^{-38}$ m$^4$/V and the average molecular weight of R with the meaning given under (b) and (c) amounts to at least $5 \times 10^{-4}$.

Preferably at least 25% of the above-mentioned recurring units of the polymer and most preferably nearly all of them contain hyperpolarizable groups of the above defined level of molecular polarizability, and preferably such polymers have a hyperpolarizability density of at least $10^{-10}$ m/V. Further details of this electro-optical polymer material, regarding the selection of a particular variety thereof as well as regarding their preparation, are disclosed in the previously mentioned European patent application. When deposited from a volatile solvent to produce a thin film on a substrate this electro-optical polymer material forms a poled glassy film. The film is poled in an overall way by the presence of an electric field during preparation. The electro-optic coefficient of this material is at least about 3 times higher than that of $LiNbO_3$, in which case a $\Delta n > 0.005$ at $IV/\mu m$ in this material will be possible.

Experiments with similar materials have shown that values of electro-optic coefficient 30 times that of $LiNbO_3$ are reachable. These similar materials are polymers with a somewhat different backbone but with the same electro-optical side groups and spacers, which were obtained from Akzo N. V., the owner of European patent application 88200512.7, and are expected to be disclosed shortly in a published patent application. The film layer can be applied with a suitably chosen thickness (some $\mu$ms) by means of the spinning method. The electro-optic material is prepared as a polymer before dissolving it in a volatile solvent for producing a film.

A structure of the sort described in what precedes appears to act as a light wave conductor already at a relatively low voltage of c. 5 V between the electrodes 1.2 and 1.6. In this case optical transmission can take place in the range of 450–2000 nm. The path via which optical transmission takes place is mainly determined by the shape and the dimensions of the strip electrode 1.6.

According to a further aspect of the present invention the buffer layer 1.5, adjacent to first or upper electrode 1.6 in FIG. 1, instead of covering substantially the entire area of the adjacent major surface of thin film layer 1.4, in an alternative embodiment is advantageously formed as a strip-shaped ridge 5.5, substantially in registration with the adjacent first electrode 5.6. Thereby the voltage to be applied across thin film layer 5.4 through first electrode 5.6 and the common second electrode 5.2 for inducing a light wave guiding path in said thin film conforming in size and shape to the pattern of first electrode 5.6, is lowered compared to the structure of the type as shown in FIG. 1.

The above alternative embodiment is shown in FIG. 5. Similar parts of the embodiments shown in FIGS. 1 and 5 bear reference numbers merely differing by their prefix.

As shown in FIG. 5 the buffer layer lying beneath the first electrode 5.6 is a strip-shaped ridge 5.5, which is made for example of $SiO_2$, or polystyrene; said buffer layer and said first electrode 5.6 are arranged in substantial registration on the upper major surface of thin film layer 5.4. Due to the mere presence of the strip-shaped buffer layer 5.5, the effective refractive index in the thin film region lying beneath first electrode 5.6 and strip-shaped buffer ridge 5.5 is increased. In other words a strip loaded light waveguide, or a ridge light waveguide (in case the refractive index of the buffer ridge equals that of the thin film layer 5.4) is obtained thereby. In general buffer layers, in addition to preventing light propagation losses from contact of the metal electrodes with the light guiding layer, have a confinement function in the vertical direction for the light waves propagating through the e/o induced waveguides. More particularly, strip-shaped buffer layers can, moreover, improve the lateral confinement of guided wave energy, as will be made clear below. The importance of the function is enhanced as the electro-optical layer becomes thinner, from around 0.1 mm to the range of 1–10 $\mu$m.

The height $h_s$ of the strip-shaped buffer ridge 5.5 determines whether or not a certain light mode is allowed to propagate through thin film layer 5.4. For example there is a critical cut off value $h_{sc}(\lambda_o)$ for which a fundamental mode $EM_{oo}$ of light waves having a wavelength $\lambda_o$ (in vacuum) is cut off (cannot propagate through thin film layer 5.4) if the actual height $h_s$ (or thickness) of the buffer ridge 5.5 is smaller than $h_{sc}(\lambda_o)$. Thus a structure having a strip-shaped buffer ridge enables a designer to create a "waveguide subthreshold". Consequently when means are provided for applying a voltage across thin film layer 5.4 through first and second electrodes 5.6 and 5.2, either the electro-optic effect inducing a light wave guiding path in the thin film layer is effectively amplified, or in case the buffer ridge height $h_s$ is smaller than $h_{sc}(\lambda_o)$ for a certain mode such as $ME_{oo}$, a light wave guiding path can be selectively established by control of the applied voltage. However, the strip-shaped buffer ridge described above has as its primary object to locally, i.e. the region lying beneath the first electrode, heighten the effective refractive index of the electro-optic thin film, thereby augmenting the electro-optic effect established by the application of an electric voltage across said thin film layer through the first and second electrodes. The combined action caused by the aforementioned buffer ridge and applied electric voltage, enables an $EM_{oo}$ light wave mode to efficiently propagate through the established light wave transmission path, while effectively cutting off other, undesired, (higher order) modes.

Moreover the strip-shaped buffer ridge functions to more effectively concentrate the field lines of the electrical field caused by the application of an electric voltage across the thin film layer through the first and second electrodes, within the region lying beneath said electrode. More in particular the buffer ridge causes the electric field to locally constrict, thereby more sharply focussing the electric field lines onto the opposing electrode region lying in registration with said buffer ridge and first electrode. Thereby the electro-optic effect established in the thin film layer is enhanced, and thus the "lateral confinement" of the optic field is improved.

Apparently with a structure as schematically shown in FIG. 1, the intensity profile of the guided light is elliptically shaped. Thus there is a mis-match between the intensity profile thus shaped and that of light waves from a monomode glass fibre. The latter has a circularly shaped profile. Therefore conversion losses are caused to occur when the above structure is optically coupled to a monomode glass fibre. For overcoming such deficiency the "long" axis of the elliptical profile should be shortened. This effect is achieved with the structure as schematically shown in FIG. 5. In other words the height of the strip-shaped buffer ridge described above is instrumental in: improving the shape of the intensity profile; improving the electro-optic effect; and decreasing the attenuaton per unit of transmission path length.

A light waveguide structure of the present invention allows the thin film layer of electro-optic material included therein to become locally poled in those regions only which are in registration with the pattern of the first electrode.

This option can be utilized either as an alternative of the above structure having a strip-shaped buffer ridge, or as a means to amplify the effect established by such a strip-shaped buffer ridge.

Starting from monomodus TM light, the light-electric field interaction, considered over the whole upper surface of the second buffer layer 1.5, is practically constant. In other words, this interaction is independent of the direction of propagation of the light, which is due to the direction of the field, the electric field vector of the light and the optical axis of the electro-optic polymer film, perpendicular to said upper surface. In consequence of this one or more of said strip electrodes such as 1.6 can be mounted on the second buffer layer 1.5 according to numerous different configurations. By providing each of these electrodes with a separate electric connecting device it will be possible to realize active optical components or combinations of them in a simple way.

A structure of the sort described with reference to FIG. 1 can act as an optical phase modulator, when it is provided with a single strip electrode 1.6. For that purpose a modulating alternating voltage has to be added to the direct voltage which causes the necessary electric field. This offers the possibility to modulate up to very high frequencies.

A further embodiment of an integrated optical directional coupling composed of electro-optically inducible waveguides of a structure described in what precedes, is schematically represented in FIG. 2. This figure shows a top view of a configuration of six strip electrodes 2.1; 2.2; 2.3; 2.4; 2.5 and 2.6, which are each comparable with the electrode 1.6 of the structure according to FIG. 1. Illustrative of the dimensions of these electrodes are: width 3 $\mu$m; thickness 0.2 $\mu$m; length (electrodes 2.2 and 2.5)$\approx$1 $\mu$m. The distance between the rows 2.1-2.3 and 2.4-2.6 is in the order of 1-3 $\mu$m. Further illustrative dimensions of the structure are:

thickness second buffer layer $\approx$0.1-2.0 $\mu$m;
thickness electro-optical film $\approx$3 $\mu$m;
thickness first buffer layer $\approx$0.1-2.0 $\mu$m;
thickness counter electrode $\approx$0.1-0.3 $\mu$m.

The thick-drawn lines are illustrative of two possible transmission paths 2.7 and 2.8. The path 2.7 will be induced when the electrodes 2.1; 2.2 and 2.3 are energized; the path 2.8 will be induced when the electrodes 2.3; 2.5 and 2.4 are energized. Such a directional coupling has the following advantages:

high coupling efficiency;
small cross talk
small attenuation on account of "smooth walls" and the fact that there are no "kinks" in the electrodes; and
simplified manufacturing process.

An embodiment of an integrated optical switch composed of inducible waveguides according to FIG. 1 is represented in FIG. 3. This figure shows a configuration of four electrodes 3.1; 3.2; 3.3 and 3.4. Illustrative dimensions of this structure are:

width of the electrodes $\approx$3 $\mu$m;
distance between the electrodes such as 3.1-3.3 (3.4) and 3.2-3.3 (3.4)$\approx$2 $\mu$m;
thickness electrodes $\approx$0.2 $\mu$m;
thickness buffer layers (each) c. 0.1-2 $\mu$m;
thickness electro-optic film c. 1.5 $\mu$m.

When energizing (c. 5.5 V) the electrodes 3.3; 3.4; 3.1 and 3.2, the whole will act as a communicative switch, for which the characterizing transmission path is designated by 3.5 in FIG. 3.

When energizing the electrodes 3.3 and 3.1 or 3.3 and 3.2, the whole will act as a distributive switch, for which the characterizing transmission paths are designated by 3.6 and 3.7 in FIG. 3. The dimensioning and the material of the structure according to FIG. 3 can be chosen in such a way that the lengths $L_1$ and $L_2$ between the couplings are about equal to each other. In that case the electrode 3.4 can be dispensed with.

Besides the advantages mentioned in what precedes, this embodiment according to FIG. 3 has the advantage that one and the same physical component can be used at choice as a distributive switch or as a communicative switch.

FIG. 4 is illustrative of an embodiment of an integrated inducible waveguide, in which the light propagates according to a curved path. Such as structure comprises the following parts:

a substrate 4.1;
an electrically conductive film 4.2 acting as an electrode;
a first light insulating buffer layer 4.3;
an electro-optic film 4.4 with an arcuate ridge disposed on it;
a second light insulating buffer layer 4.6; and
an electrode 4.7, which is also arcuate and which is disposed on the second buffer layer 4.6, thereby partly overlapping the ridge.

When energizing the two electrodes 4.2 and 4.7 a wave guiding path having an arcuate shape will be induced in the electro-optic film 4.4. Such a structure offers the possibility to induce transmission bends with a small radius of curvature of for example c. 50 $\mu$m.

Further advantages are:
small losses; and
simplified manufacturing process.

This is due to the fact that for moulding the ridge 4.5 and the electrode 4.7 one and the same mask can be used.

The following examples of the preferred electro-optic polymers identified above are now described below and will be followed by an example of making the layer of such a polymer as part of the making of one of the devices described and illustrated herein.

EXAMPLE I a. Preparation of 4-(4-hydroxypiperidino)-4'-nitrostilbene

A solution of 123 g of 4-(4-hydroxy)piperidinobenzaldehyde (obtained in accordance with the procedure described by Taylor et al. in Synthesis, (1982), p. 606), 163 g of 4-nitrophenyl acetic acid, and 60 ml of piperidine in 2000 ml of dimethyl formamide was stirred for 48 hours at 25° C. The resulting reaction mixture was fully concentrated by evaporation at 80° C., after which the residue was titrated with 2 portions of 1000 ml of petroleum ether (boiling point 40°-60° C.). The next step consisted in 10 minutes boiling with refluxing in 1500 ml of ethanol, with the precipitate hardly dissolving. After cooling to 0° C. the reaction mixture was kept at that temperature for 16 hours, after which the precipitate was isolated by filtration and subjected to a second washing treatment with 500 ml of ethanol.

Obtained were 140 g of 4-(4-hydroxypiperidino)-4'-nitrostilbene having a melting point of 248° C.

b. Preparation of 4-(4-hydroxypiperidino)-4'-nitrostilbene acrylate ester

To a solution of 130 g of 4-(4-hydroxypiperidino)-4'-nitrostilbene, 800 mg of 2,6 ditertiary butyl-4-methyl phenol, 1600 ml of dichloromethane, and 84 ml of triethylamine was added dropwise with stirring at 25° C. over a period of 30 minutes a solution of 48 ml of acryloyl chloride in 400 ml of dichloromethane, after which the reaction mixture was stirred for a further 16 hours. Subsequently, 30 ml of methanol were added, after which the reaction mixture was washed with 1000 ml of 1M NaHCO$_3$ solution. After the organic layer had been dried with magnesium sulphate, the mixture was concentrated by evaporation. The residue was purified by recrystallization from a mixture of 1000 ml of dichloromethane and 500 ml of acetone.

Obtained were 100 g of 4-(4-hydroxypiperidino)-4'-nitrostilbene acrylate ester having a melting point of 199° C.

c. Polymerization of 4-(4-hydroxypiperidino)-4'-nitrostilbene acrylate ester In a manner analogous to that in Example I 100 g of the acrylate ester were dissolved in 1000 ml of ortho-dichlorobenzene and then stirred for 5 hours under nitrogen at 100° C., with 10 portions of 4 g of 2,2'-azobisisobutyronitrile (AIBN) added at 30-minute intervals.

After cooling the reaction mixture was poured into 10 l of petroleum ether (boiling point 60°-80° C.). A precipitate was formed which was separated by filtration, dissolved in 500 ml of dichloromethane, and again poured into 10 l of petroleum ether (boiling point 60°-80° C.). Following filtration and drying there were obtained 100 g of an orange-coloured powder with an $\overline{MHD}$ w (average molecular weight) of 8600 and a Dp of $24 \times 10^{-11}$ m/V. A glass transition temperature Tg was found to be 160° C.

EXAMPLE II a. Preparation of 1-trityloxy-6-chlorohexane

A mixture of 111 g of trityl chloride, 1 l of dichloromethane, 58,5 ml of 6-chlorohexanol-1, 67 ml of triethylamine, and 0,5 g of dimethyl aminopyridine was stirred for 4 hours at 25° C. After washing the dichloromethane solution with a solution of 400 ml of 1M NaHCO$_3$ and 400 ml of water the organic layer was dried with magnesium sulphate and concentrated by evaporation. To the residue were then added 200 ml of methanol, after which part of it was evaporated. The resulting crystalline precipitate was separated and after-washed with 50 ml of methanol.

Obtained were 110 g of 1-trityloxy-6-chlorohexane.

b. Preparation of 4-(6-hydroxyhexyloxy)piperidine

To a mixture of 7 g of sodium hydride and 200 ml of dimethyl formamide (DMF) was added dropwise with stirring at 25° C. over a period of 30 minutes a solution of 25 g of N-acetyl-4-hydroxypiperidine in accordance with the procedure given by Mc Manus et al. in J. Med. Chem. (1965), p. 766, and 2,9 g of potassium iodide in 200 ml of DMF. To this was added dropwise over a period of 10 minutes a solution of 100 g of 1-trityloxy-6-chlorohexane in 200 ml of DMF. The reaction mixture was then stirred for another 24 hours at 25° C. and next concentrated by evaporation to about 200 ml at reduced pressure and 75° C. The residue was poured into 200 ml of water and 200 ml of dichloromethane. Following isolation of the organic layer the layer of water was once more extracted with 200 ml of dichloromethane. After having been combined, the organic layers were dried with magnesium sulphate and concentrated by evaporation. To the resulting oil were added 400 ml of 4N HCl, after which the reaction mixture was boiled with refluxing for 16 hours. After cooling the reaction mixture was extracted twice, each time with 100 ml of ether. Then the layer of water was neutralized with an excess (about 80 g) of NaOH pellets to pH>12. The basic solution was extracted with 5 portions of 200 ml of dichloromethane. The combined dichloromethane layers were dried with magnesium sulphate and concentrated by evaporation to an oil which crystallized out slowly.

Obtained were 20 g of 4-(hydroxyhexyloxy) piperidine.

c. Preparation of 4-(4-(6-hydroxyhexyloxy)-piperidino)-4'-nitrostilbene

A mixtue of 20 g of 4-(6-hydroxyhexyloxy)piperidine, 12 ml of fluorobenzaldehyde, 13,8 g of potassium carbonate and 160 ml of acetonitrile was boiled with refluxing for 48 hours under nitrogen. After cooling the reaction mixture was poured into 300 ml of water and 100 ml of dichloromethane. Following isolation of the orgaic layer the layer of water was extracted twice, each time with 100 ml of dichloromethane. After having been combined, the organic layers were dried and then concentrated by evaporation to an oil (about 30 g). After 30 g of 4-nitrophenyl acetic acid, 10 ml of piperidine and 400 ml of DMF had been added, the mixture was stirred for 48 hours at 25° C. Next, the reaction mixture was fully concentrated by evaporation at 80° C. The residue was titrated 3 times with petroleum ether (boiling point 40°-60° C.). After concentration by evaporation and drying there were obtained 24 g of 4-(4-(6-hydroxyhexyloxy)piperidino)-4'-nitrostilbene.

d. Preparation of 4-(4-(6-hydroxyhexyloxy)-piperidino)-4'-nitrostilbene acrylate ester To a mixture cooled down to 0° C. of 21 g of 4-(4-(6-hydroxyhexyloxy)piperidino)-4'-nitrostilbene, 40 mg of 2,6-ditertiary butyl-4-methylphenol, 160 ml of dichloromethane, and 10,5 ml of triethylamine was added dropwise with stirring over a period of 30 minutes a solution of 5 ml of acryloyl chloride in 40 ml of dichloromethane. Stirring of the reaction mixture was continued for 16 hours at 25° C. Following the addition of 4 ml of methanol the dichloromethane solution was washed with 100 ml of 1M NaHCO$_3$. After drying with magnesium sulphate the organic layer was concentrated by evaporation. The residue was crystallized from a mixture of 100 ml of acetone and 50 ml of ethanol. Obtained were 16 g of 4-(4-(6-hydroxyhexyloxy)-piperidino)-4'-nitrostilbene acrylate ester.

e. Polymerization of 4-(4-(6-hydroxyhexyloxy)-piperidino)-4'-nitrostilbene acrylate ester To a solution stirred at 100° C. of 4-(4-(6-hydroxyhexyloxy)-piperidino)-4'-nitrostilbene acrylate ester in ortho-dichlorobenzene were added over a period of 5 hours at 30-minute intervals 10 portions of 400 mg of AIBN. After cooling the reaction mixture was poured into 1 l of petroleum ether (boiling point of 60°–80° C.). The precipitate was separated, dissolved in 50 ml of dichloromethane, and again poured into 1 l of petroleum ether (boiling point 60°–80° C.). Following filtration and drying 10 g of an orange-red powder were obtained.

In determining the properties an $\overline{\lambda}_{max}$ was measured at 418 nm, with an $\overline{M}_w$ (average molecular weight) of 5800 being found.

For the Dp a value of $19 \times 10^{-11}$ m/V was obtained. The Tg was found to be 74° C.

EXAMPLE III

In a manner analogous to that in Example II several acrylate esters were prepared having the formula

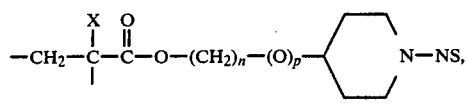

wherein NS has the meaning of a nitrostilbene group. The properties of the resulting polymers are shown in the table below.

TABLE 1

| Polymer | n | p | X | $\overline{M}_w$ | Tg(°C.) | $Dp(m/V) \cdot 10^{-11}$ |
|---|---|---|---|---|---|---|
| 1 | 0 | 0 | H | 7800 | 160 | 24 |
| 2 | 0 | 0 | CH₃ | 2000 | 115 | 23,1 |
| 3 | 2 | 0 | H | 9500 | 112 | 22,3 |
| 4 | 10 | 1 | H | 8500 | 50 | 17,0 |

EXAMPLE IV

The forming of an electro-optical layer upon a glass substrate either coated or uncoated with a buffer layer is performed as follows:

Layers of polymer 1 Table 1 of Example III were put upon glass substrates from a solution of 10 grams of the polymer in 40 ml of cyclopentanone by dipping. Thermal annealing, simply by cooling after baking on a hot plate, resulted in stable crack-free films. It was difficult, however, to provide crack-free films, with multilayering such as is necessary to provide the buffer layers.

In order to improve the making of electo-optical films on a substrate in a multilayer structure, for example with a conducting film of aluminum or gold on the substrate (1.2 in FIG. 1 and 5.2 in FIG. 5) and a buffer layer 1.3 or 5.3 immediately below the electro-optical layer 1.4 or 5.4, one of the aforesaid similar polymer materials with a backbone different from those of the initially preferred polymers but having the same electro-optical side groups and spacers was used.

First such a similar polymer was applied to glass substrates by dipping, being deposited from a solution of 10 grams of the polymer in 40 ml of cyclopentanone. Here again thermal annealing resulted in stable crack-free films. For this purpose the substrates were baked at 80° C. for about 25 minutes with the back side of the substrates in contact with a hot plate. The layer thickness was typically 2.5 μm. Multiple dippings (2 or 3 times) upon well dried (annealed) films resulted in films having thicknesses up to about 10 μm. The films were crack-free but showed some waviness. Thin films (0.7 μm) were then made by spinning (at 3000 r.p.m.). These films were found to remain crack-free without the annealing procedure.

Good quality multilayers were then made on glass substrates covered first with a vapor-deposited aluminum layer, then with a vapor-deposited silicone dioxide layer, and then covered by PMMA from a xylene solution by dipping. The optical attenuation of wave guides made in such multilayers is low. It was measured at less than 1 dB per cm at a wave length of 1523 μL m.

I claim:

1. An electro-optically inducible light wave guide device comprising: a substantialy flat portion of electro-optic material, a first electrode formed in a preselected pattern on one major surface of said electro-optical material portion, a second electrode formed on an opposing surface of said portion, a first buffer layer interposed between said first electrode and said portion of electro-optic material, a second buffer layer interposed between said second electrode and said portion of electro-optic material and means for causing a voltage to occur across said portion of electro-optic material through said first and second electrodes, characterized in that said portion of electro-optic material is a thin film of a poled glassy polymer applied on said second buffer layer in an already polymerized state; said polymer having an electro-optic effect of $\Delta n > 0.005$ at 1 V/μm, where $\Delta n$ represents a change by refractive index n of said electro-optic material caused by said voltage; the composite structure including in the following order said first electrode, said first buffer layer, said thin film, said second buffer layer, and said second electrode, is supported on and attached to a substrate; and said second electrode covers substantially the entire area of that major surface of said thin film turned towards said substrate.

2. A light waveguide device according to claim 1, characterized in that said thin film of electro-optic material is locally poled in those regions only where said first and second electrodes are aligned in registration.

3. A light waveguide device according to claim 1, characterized in that said buffer layer is locally disposed to form a ridge, of predetermined height, on those thin film portions only which are in registration with said first electrode.

4. A light waveguide device according to claim 1, wherein said first electrode is arranged on said one major surface in a composite preselected pattern of a plurality of parallel strips, characterized in that said pattern includes three pairs of parallel strips, said pairs extending co-linearly while being disposed adjacent to each other; each one of said strips having its individual connecting means for receiving an electric voltage.

5. A light waveguide device according to claim 1, wherein said first electrode is arranged on said one major surface in a composite preselected pattern including a pair of parallel strips, characterized in that said pattern includes a third strip paritally extending in between said parallel strips and in parallel thereto; each one of the strips included in said pattern having its individual connecting means for receiving an electric voltage.

6. A light waveguide device according to claim 5, characterized by a further strip section interposed between said pair of parallel strips; said further and third strips extending co-linearly, while being disposed adjacent to each other; each one of the strips included in the preselected composite pattern having its individual connecting means for receiving an electric voltage.

7. A light waveguide device according to claim 1, wherein said first electrode includes a bended strip portion, characterized in that said thin film in its major surface facing said buffer layer, has a ridge of electro-optic material integrally formed therewith; said ridge substantially conforming in size and shape to said bended strip portion; said bended strip portion is disposed in partially overlapping relation to said ridge.

8. A light waveguide device according to claim 2, characterized in that said first buffer layer is locally disposed to form a ridge, of predetermined height, on those thin film portions only which are in registration with said first electrode.

9. A light waveguide device according to claim 2, wherein said first electrode is arranged on said one major surface in a predetermined composite pattern of a plurality of parallel strips, characterized in that said pattern includes three pairs of parallel strips, said pairs extending co-linearly while being disposed adjacent to each other; each one of said strips having its individual connecting means for receiving an electric voltage.

10. A light waveguide device according to claim 2, wherein said first electrode is arranged on said one major surface in a predetermined composite pattern including a pair of parallel strips, characterized in that said pattern includes a third strip partially extending in between said parallel strips and in parallel thereto; each one of the strips included in said pattern having its individual connecting means for receiving an electric voltage.

11. A light waveguide device according to claim 2, wherein said first electrode includes a bended strip portion, characterized in that said thin film on its major surface facing said buffer layer, has a ridge of electro-optic material integrally formed therewith; said ridge substantially conforming in size and shape to said bended strip portion, and said bended strip portion being disposed in partially overlapping relation to said ridge.

12. A light waveguide device according to claim 3, wherein said first electrode is arranged on said one major surface in a preselected composite pattern of a plurality of parallel strips, characterized in that said pattern includes three pairs of parallel strips, said pairs extending co-linearly while being disposed adjacent to each other; each one of said strips having its individual connecting means for receiving an electric voltage.

13. A light waveguide device according to claim 3, wherein said first electrode is arranged on said one major surface in a preselected composite pattern including a pair of parallel strips, characterized in that said pattern includes a third strip partially extending in between said parallel strips and in parallel thereto; each one of the strips included in said pattern having its individual connecting means for receiving an electric voltage.

14. A light waveguide device according to claim 3, wherein said first electrode includes a bended strip portion, characterized in that said thin film on its major surface facing said buffer layer, has a ridge of electro-optic material integrally formed therewith; said ridge substantially conforming in size and shape to said bended strip portion; said bended strip portion is disposed in partially overlapping relation to said ridge.

15. A light waveguide device comprising: a substantially flat portion of electro-optic material, a first electrode formed in a preselected pattern on one major surface of said electro-optic material portion, a second electrode formed on an opposing surface of said portion, first and second buffer layers respectively interposed between said first and second electrodes and said portion of electro-optic material and means for causing a voltage to occur across said portion of electro-optic material through said first and second electrodes, characterized in that said portion of electro-optic material is a thin film of a poled glassy polymer; said polymer having an electro-optic effect of $\Delta n > 0.005$ at $1$ V/$\mu$m, where $\Delta n$ represents a change of refractive index n of said electro-optic material caused by said voltage; the composite structure, including in the following order said first electrode, said first buffer layer, said thin film, said second buffer layer, and said second electrode, is supported on and attached to a substrate; said second electrode covers substantially the entire area of that major surface of said thin film which is turned towards said substrate, and said thin film of electro-optic material is locally poled in those regions only where said first and second electrodes are aligned in registration.

16. A light waveguide device according to claim 15, wherein said first electrode is arranged on said one major surface in a pattern including a preselected composite pair of parallel strips, characterized in that said pattern includes a third strip partially extending in between said parallel strips and in parallel thereto; each one of the strips included in said pattern having its individual connecting means for receiving an electric voltage.

17. A light waveguide device according to claim 16, characterized by a further strip section interposed between said pair of parallel strips; said further and third strips extending co-linearly, while being disposed adjacent to each other; each one of the strips included in the preselected composite pattern having its individual connecting means for receiving an electric voltage.

18. A light waveguide device comprising: a substantially flat portion of electro-optic material, a first electrode formed in a preselected pattern on one major surface of said portion, a second electrode formed on an opposing surface of said portion, first and second buffer layers respectively interposed between said first and second electrodes and said portion of electro-optic material and means for causing a voltage to occur across said portion of electro-optic material through said first and second electrodes, characterized in that said portion of electro-optic material is a thin film of a poled glassy polymer applied on said second buffer layer in an already polymerized form; said polymer having an $\Delta n > 0.005$ at $1$ V/$\mu$m, with $\Delta n$ representing a change of refractive index n of said electro-optic material caused by said voltage; the composite structure, including in the following order said first electrode, said first buffer layer, said thin film, said second buffer layer, and said second electrode, is supported on and attached to a substrate; said second electrode covers substantially the entire area of that major surface of said thin film turned towards said substrate; and said first buffer layer is locally disposed to form a ridge, of predetermined height, on those thin film portions only which are in registration with said first electrode.

19. A light waveguide device according to claim 18, wherein said first electrode is arranged on said one major surface in a preselected composite pattern including a pair of parallel strips, characterized in that said pattern includes a third strip partially extending in between said parallel strips and in parallel thereto; each one of the strips included in said pattern having its individual connection means for receiving an electric voltage.

20. A light waveguide device according to claim 19 characterized by a further strip section interposed between said pair of parallel strips; said further and third strips extending co-linearly, while being disposed adjacent to each other; each one of the strips included in the preselected composite pattern having its individual connecting means for receiving an electric voltage.

21. An electro-optically inducible light wave guide device comprising: a substantially flat portion of electro-optic material, a first electrode formed in a preselected pattern on one major surface of said electro-optic material portion, a second electrode formed on an opposing surface of said electro-optic material portion, and means for causing a voltage to occur across said portion of electro-optic material through said first and second electrodes, characterized in that said portion of electro-optic material is a thin film of a poled glassy polymer applied on said second electrode in an already polymerized state; said polymer having an electro-optic effect of $\Delta n > 0.005$ at 1 V/$\mu$m, where $\Delta n$ represents a change of refractive index n of said electro-optic material caused by said voltage; the composite structure including in the following order said first electrode, said thin film, and said second electrode, is supported on and attached to a substrate; and said second electrode covers substantially the entire area of that major surface of said thin film which is turned towards said substrate.

22. A light waveguide device comprising: a substantially flat portion of electro-optic material, a first electrode formed in a preselected pattern on one major surface of said electro-optic material portion, a second electrode formed on an opposing surface of said portion, and means for causing a voltage to occur across said portion of electro-optic material through said first and second electrodes, characterized in that said portion of electro-optic material is a thin film of a poled glassy polymer; said polymer having an electro-optic effect of $\Delta n > 0.005$ at 1 V/$\mu$m, where $\Delta n$ represents a change of refractive index n of said electro-optic material caused by said voltage; the composite structure, including in the following order said first electrode, said thin film, and said second electrode, is supported on and attached to a substrate; said second electrode covers substantially the entire area of that major surface of said thin film which is turned towards said substrate; and said thin film of electo-optic material is locally poled in those regions only where said first and second electrodes are aligned in registration.

23. A light waveguide device comprising: a substantially flat portion of electro-optic material, a first electrode formed in a preselected pattern on one major surface of said portion, a second electrode formed on an opposing surface of said portion, a buffer layer interposed between said first electrode and said portion of electro-optic material and means for causing a voltage to occur across said portion of electro-optic material through said first and second electrodes, characterized in that said portion of electro-optic material is a thin film of a poled glassy polymer applied on siad buffer layer in an already polymerized form; said polymer having a $\Delta n > 0.005$ at 1 V/$\mu$m, with $\Delta n$ representing a change of refractive index n of said electro-optic material caused by said voltage; the composite structure, including in the following order said first electrode, said buffer layer, said thin film, and said second electrode, is supported on and attached to a substrate; said second electrode covers substantially the entire area of that major surface of said thin film which is turned towards said substrate; and said buffer layer is locally disposed to form a ridge, of predetermined height, on those thin film portions only which are in registration with said first electrode.

* * * * *

UNITED STATES PATENT AND TRADEMARK OFFICE
CERTIFICATE OF CORRECTION

PATENT NO. : 4,867,516

DATED : September 19, 1989

INVENTOR(S) : Nicolaius H. G. BAKEN

Page 1 of 2

It is certified that error appears in the above-identified patent and that said Letters Patent is hereby corrected as shown below:

ON THE TITLE PAGE, under "OTHER PUBLICATIONS" the fifth reference (SPIE vol.578...) change "pp. 130-136" to -- pp. 131-136. --

COLUMN 2, line 63, before "evaporation" insert -- application thereof in already polymerized form on said second electrode or on a second buffer layer superposed on said second electrode, for example by --.

lines 64 - 67, delete "application thereof in already polymerized form on said second electrode or on a second buffer layer superposed on said second electrode, for" and in place thereof insert -- in a --.

COLUMN 11, line 38, "$\overline{MHD}$ w" should be -- $\overline{M}_w$ --.

COLUMN 12, line 24, "mixtue" should be -- mixture --.

lines 29 - 30, "or-gaic" should be -- or-ganic --.

UNITED STATES PATENT AND TRADEMARK OFFICE
CERTIFICATE OF CORRECTION

PATENT NO. : 4,867,516
DATED : September 19, 1989
INVENTOR(S) : Nicolaius H. G. BAKEN It is certified that error appears in the above-identified patent and that said Letters Patent is hereby corrected as shown below:

COLUMN 14, line 9, "1523 µL m." should be -- 1523 µm. --.
          line 27 (Claim 1), "by" should be -- of --.
          line 34 (Claim 1) after "film" insert -- which is --.

COLUMN 15, line 3 (Claim 7), after "film" change "in" (second occurrence) to -- on --.

COLUMN 16, lines 23 - 24 (Claim 16), before the word "pattern" insert -- preselected composite -- and after "including a" delete "preselected composite".

COLUMN 16, line 57 (Claim 18), before "turned" insert

Signed and Sealed this

Thirtieth Day of April, 1991

*Attest:*

HARRY F. MANBECK, JR.

*Attesting Officer*      *Commissioner of Patents and Trademarks*